United States Patent

Dammel et al.

[11] Patent Number: 4,743,125
[45] Date of Patent: May 10, 1988

[54] AERODYNAMIC SLIDE BEARING

[75] Inventors: Uwe Dammel, Nauheim; Bernd Domes, Wehrheim, both of Fed. Rep. of Germany

[73] Assignee: Kloeckner-Humboldt-Deutz AG, Fed. Rep. of Germany

[21] Appl. No.: 936,370

[22] Filed: Dec. 1, 1986

[30] Foreign Application Priority Data

Dec. 14, 1985 [DE] Fed. Rep. of Germany ....... 3544392

[51] Int. Cl.⁴ .............................................. F16C 32/06
[52] U.S. Cl. ..................................... 384/99; 384/117; 384/119
[58] Field of Search ................. 384/99, 104, 106, 117, 384/119, 103

[56] References Cited

U.S. PATENT DOCUMENTS

| | | | |
|---|---|---|---|
| 3,215,480 | 11/1965 | Marley | 384/104 |
| 4,445,792 | 5/1984 | Trippett | 384/103 |
| 4,627,746 | 12/1986 | Grisel et al. | 384/119 |

Primary Examiner—Lenard A. Footland
Attorney, Agent, or Firm—Charles L. Schwab

[57] ABSTRACT

An aerodynamic slide bearing which uses air as a lubricant. A shaft is supported on substructures distributed about its circumference, which exhibit predetermined elasticity and dampening behavior. A dampening chamber is located between each substructure and an outer casing to give the aerodynamic slide bearing requisite dampening characteristics. Because of the modular design, the aerodynamic slide bearing is relatively insensitive to shifting of the shaft.

26 Claims, 4 Drawing Sheets

AERODYNAMIC SLIDE BEARING

TECHNICAL FIELD

This invention relates to an aerodynamic slide bearing for shafts which rotate at high speeds with an elastic and dampening structure connected to a stationary, outer casing, which has at least one dampening chamber between the elastic and dampening structure and its interior, and wherein a plurality of converging wedges provide lubrication pockets between the elastic and dampening structure and the supported shaft.

PRIOR ART STATEMENT

Aerodynamic slide bearings use air and other gases as lubricants. The pressure in the lubrication pocket which is necessary for the load capacity of the bearing is self-created, similar to the way it is created in hydraulic bearings, by the sliding movement of the "treads" in areas of the lubrication pocket which converge in a supporting lubrication wedge. Several lubrication wedges along the bearing circumference improve bearing guidance and stability.

The low viscosity of gases permit shaft speeds considerably higher than feasible using bearings which are liquid lubricated. At the same time, losses due to friction are reduced considerably. Gases retain their lubricating characteristics over broad temperature ranges, from extremely low to extremely high temperatures. In addition to this, there are almost no sealing problems since the lubricating medium for an aerodynamic bearing is its environment. For these reasons, aerodynamic slide bearings can be used under extreme conditions of operation; this pertains especially to bearings for extremely high speed shafts functioning at very low, as well as at very high, operating temperatures. Fields of application include high speed shafts of all kinds, for example, small gas turbines and exhaust gas turbobearings, or other turboengines.

An aerodynamic slide bearing of the radial design type is shown in West Germany patent DE-PS No. 29 09 973. In this aerodynamic bearing, two concentric thin-walled sheets are arranged, within an outer casing, as sleeves which circumferentially lap. Both thin-walled sheets are tightly connected to each other and to the outer casing by spacing pieces of various sizes which are distributed over the circumference and are staggered in their arrangement. A sort of corrugated structure is provided on the elastic sheet which forms a tread, which creates converging lubrication wedges over the circumference. Altogether, the elastic sheet with the spacing pieces forms an elastic and dampening structure, because of which the total aerodynamic bearing has an elastic and dampening effect.

This prior art bearing is distinguished by relatively good dampening and an acceptable level of starting friction, however, in practice it has a high degree of sensitivity with respect to errors in angle between the slide bearing axis. With errors in angle of this type, edge wear occurs which leads to "bearing galling" because of localized interruption of the film of lubricating air. Therefore, increased demands are made on the fabrication and assembly tolerances as well as on the slide sheets and the surface finish when operating such a prior art bearing. In addition to this, it has been shown that the fabrication of especially thin-walled and closed sheets, which are also provided with a special "tread" layer, is very expensive. Also, the positioning and mounting of the supports during assembly of the aerodynamic slide bearing present considerable difficulties. This prior art bearing is as expensive to fabricate as it is problematic during operation.

OBJECTS AND BRIEF SUMMARY OF THE INVENTION

The primary object of this invention is to provide an aerodynamic slide bearing which functions in a reliable manner and is simple to fabricate.

This object is met by an aerodynamic slide bearing with the characteristics of claim 1.

The aerodynamic slide bearing in accordance with this invention includes at least two substructures which are separate from each other and which, with a support casing, provide resilient, dampened support for a high speed shaft. The aerodynamic slide bearing of this invention is less sensitive to tilting of the shaft. Also, geometric deviations of the shaft from the design specifications which result from, for example, maintenance errors, contamination, or expansion caused by heat or by centrifugal forces can be better compensated for and because of this, the aerodynamic slide bearing of this invention is especially safe during operation. The load carrying capacity of the aerodynamic slide bearing is created by converging lubrication pockets in the shaft confronting surfaces of substructures. These shaft supporting surfaces have a strictly specified or rigid contour for supporting the shaft. By using a circumferentially spaced series of substructures which simultaneously provide resilient and dampened support, the aerodynamic slide bearing of this invention possesses the level of flexibility in extreme operating conditions to effectively absorb or tolerate low frequency shocks or surface defects. In addition to this, a correct construction of the aerodynamic slide bearing results in the favorable vibration and stability behavior of the rotor/bearing system.

The circumferential ends of the individual substructures of this invention rest separately on the outer casing, whereby an individual dampening chamber is provided behind each substructure. By supporting the substructure on the outer casing only at its circumferentially outer ends, the substructure can radially deflect at its middle in order to provide dampening of radial movements of the supported shaft. Each substructure provides dampening independently of the other substructures because the dampening chambers are separate from each other. An advantage of this invention is that each substructure can be constructed completely separate and in a completely different way from the other substructures in terms of its resiliency as well as its dampening behavior. This invention makes it relatively easy to design the aerodynamic slide bearing to operate satisfactorily when subjected to direction related loading.

The outer casing for the bearing may be cylindrical inside so that it can be easily fabricated, in which case the individual substructures can be independently inserted into the inside of the casing. In order to circumferentially mount the substructures, supports or pins are inserted through openings in the outer casing, which then secure the substructures in their proper circumferential position. The supports or pins do not extend radially as far as the shaft, and are fastened after assembly to the outer casing in an appropriately durable manner. In many applications of the bearing, it may be expedient to provide a noncylindrical design of the inside of the outer casing and to achieve the desired shaft supporting function of the inserted supports through use of alternate suspension of the whole unit, for example, by means of shocks. In such case, the supports are components which project radially inward or are radially inward extending shoulders of the outer casing.

The radially spaced and confronting surfaces defining the dampening chamber may be cylindrical and extend axially parallel to the supported shaft. The dampening chambers are radially outward of the substructures and have the shape of a segment of a pipe. When the aerodynamic slide bearing and/or a substructure is subjected to load, the substructure provides elastic support in a radially outward direction and the radial width of the dampening chamber is changed and a portion of the contents of the dampening chamber is expelled. The function of the dampening chamber depends on this change in volume. In the case of an annular ring shaped cross section of the dampening chamber, the dampening behavior of the dampening chamber is expecially easy to calculate. This provides an advantage in that the characteristics of such an aerodynamic slide bearing are accurately predictable.

Alternatively, for many applications it is expedient to adapt the shape of the dampening chambers to particular fixed conditions. For instance, if the substructures are supported radially directly on the outer casing, separate dampening chambers can be created radially outward of the substructures by appropriate radially inward extensions on the inside of the outer casing. In such case, it is expedient, for fabrication and technology related reasons, to design the dampening chamber so that it is cresent shaped in cross section. The same crescent shaped form of the dampening chamber can also be utilized advantageously whenever the outer radius of the substructure is designed in such a way that it is greater than the inner radius of the outer casing. Such dampening chamber construction contributes to inexpensive fabrication of the aerodynamic slide bearing. Tests have shown that the optimal values for the radial width of a dampening chamber is between 0.2% and 10% of the diameter of the supported bearing. The radial width here referred to is the radial width at the circumferential midpoint of the dampening chamber.

In one embodiment of the invention, the precisely contoured shaft supporting surface of the substructure is designed to be circular in cross section. The radius of the circle defined by such a surface is minutely greater than the outer radius of the supported shaft. Because of this difference in the two radii, a converging wedge-shaped lubrication pocket is provided between the shaft and each substructure, which functions as a support wedge when there is an appropriate rotation of the shaft. In some installations it may be desirable for fabrication reasons to form the contour of the shaft engaging surfaces in such a way that they are not circular in cross section, but instead may be parabolic in shape or a similar curved shape. Thus it is possible to develop a complete range of specifications for the support and/or lubrication wedges. In the case of particular operational demands being placed on the aerodynamic slide bearing, support wedges or pockets with specially designed cross-sectional profiles can be readily designed into the bearing of this invention.

The aerodynamic slide bearing of this invention may be designed to properly support a shaft which rotates in both directions. In such a design, each substructure is provided with two support wedges to provide shaft support in both directions of rotation. The surface of the substructure facing towards the bearing axis supports the shaft on a contact line which is parallel to the shaft axis and is positioned at the circumferential middle of the substructure. Moving away from this contact line—circumferentially towards both of the ends of the substructures—the radial clearance between the surface of the substructure and the shaft increases. Thus on each circumferentially opposite side of the middle, a converging support wedge is formed along the surface confronting the shaft. In accordance with the direction of rotation of the shaft, either one or the other of the converging support wedges or pockets on each substructure is put into use. It is also expedient, if only one specific direction of rotation of the shaft is desired, to arrange the support wedge on the surface confronting the shaft circumferentially at one end of the substructure, whereby each has only one converging support wedge or pocket. This support wedge can, however, accept heavier loads whereby on the whole, each substructure of an aerodynamic slide bearing of this type can be more heavily loaded. As a result of this, an aerodynamic slide bearing provided for only one direction of rotation can, if the bearing load remains equal, be smaller in size.

In accordance with this invention, the substructure can be pushed axially into the outer casing and, because of appropriate support structure, it will not fall into the radial interior of the aerodynamic slide bearing. When the aerodynamic slide bearing is in a resting or nonoperating condition, the shaft is not subjected to any prestressing by the elastic and dampening substructures. The shaft can be more or less freely turned or rotated within the aerodynamic slide bearing. Advantageously, the start-up of the shaft is thus rendered especially wear resistant since friction losses are reduced to a minimum.

Tests have shown that, using current sizes of aerodynamic slide bearings in high speed turbomachines, a total of four substructures distributed over the circumference is appropriate. Similar results are also achieved using either three or five substructures. If the supported shaft is of an especially large diameter, it may be appropriate to increase the number of substructures accordingly.

In some embodiments of the invention, the substructures are made up of two separate components. A radially inner component, which radially faces the shaft, is designed as a slide segment, and a radially outer component, which radially faces the outer casing, is designed as a spring or elastic element. Corresponding to the desired functions of the substructures, one component is thus available for each function. The good sliding characteristics and the specially designed contour of the surface which faces the shaft are guaranteed by the radially inner sliding components, while the desired resiliency can be designed into the separate radially outer elastic components. In particular, the performance for which such an aerodynamic slide bearing is designed is accurately predictable.

The loads placed on the substructure are advantageously transferred in the radial direction from the sliding component onto the elastic component, and from the circumferential ends of the elastic component to the outer casing. The elastic components as well as the sliding components are guided or positioned circumferentially by appropriate supports, such as pins, on the outer casing. A dampening chamber is provided on the radially outer side of the elastic component and it is positioned between the circumferentially opposite ends of the elastic component which are in contact with the outer casing. The radially inner sliding component can therefore be designed to be completely rigid and the loads can be transferred to the elastic component, which gives the substructure a certain elastic characteristic curve. The elastic component itself is, in addition to its elastic qualities, also provided by the dampening chamber with a specific dampening capacity. The sliding component is preferably made of artificial carbon and the elastic component preferably is made of steel. The supported shaft is made of case-hardened steel. The type of artificial carbon intended for use in this invention is a kind of pressed carbon which is substantially impermeable to air.

The sliding component may be fabricated from material formed by a sintering whereby the artificial carbon must subsequently be subjected to an additional heat treatment. In order to create the desired surface contour on the sliding components, they are subsequently machined using an "aerodizing" fabricating technique. Ceramic and bronze also have been proven to be good materials for the sliding components. The elastic components are preferably made from appropriate pipes whereby the individual elastic component is an arcuate segment cut from such a pipe. Alternately, it may also be advantageous to fabricate the elastic component from a flat steel plate using pipe forming or bending techniques.

In another embodiment of the invention, the substructures are a single component which in the radial direction is supported on the outer casing only at its circumferentially opposite ends. This single component must, on the one hand, have a shaft supporting surface contour which for the most part has a predetermined shape and is rigid, while at the same time it must exhibit certain elasticity in radial direction in order to produce the desired elastic rigidity. Designing all these characteristics into a single component presents considerable problems, however, these are completely counterbalanced by the low cost of production when there is mass production of the component.

There are fabrication and assembly advantages in making each of the substructures in the shape of an arcuate plate or in the form of an arcuate segment of a hollow cylinder with its inner radius being minutely greater than the shaft radius and its outer radius being slightly greater than the inner radius of the outer casing. In such a construction, the outer casing has a cylindrical interior. The damping chambers for substructures are automatically formed because of the chamber shaped between the outer radius of the substructure and the inner radius of the outer casing which is crescent shaped in cross section. Since the outer casing has a cylindrical interior, the substructures can be pushed axially into the interior of the outer casing. The substructures can be maintained in circumferentially fixed positions by means of a pin or pins inserted into the casing from the outside. In the radial direction, the substructures have their circumferentially opposite ends resting directly on the outer casing.

When using aerodynamic slide bearings having substructures which are single piece components, it has been proven advantageous to fabricate the substructures out of a composite or laminated material which has an especially high carbon content. The carbon content guarantees the proper sliding properties of the aerodynamic slide bearing.

BRIEF DESCRIPTION OF THE DRAWINGS

Various embodiments of the invention are shown in the drawings, in which.

DETAILED DESCRIPTION OF THE DRAWINGS

Figure 1:
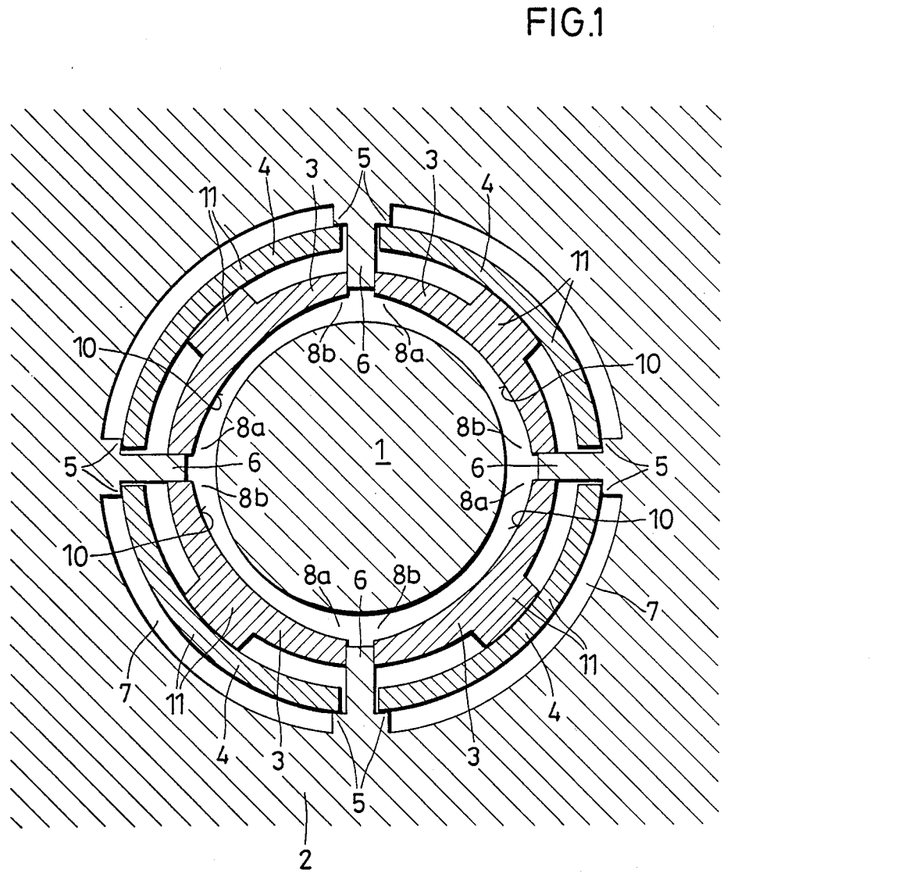
FIG. 1 is a cross section through one embodiment of an aerodynamic slide bearing of this invention in which the substructures each includes two components.

Referring to FIG. 1, an aerodynamic slide bearing radially supports a high speed shaft 1 relative to an outer casing 2. In the circumferential direction of the aerodynamic slide bearing, four individual sliding segments or components 3 are provided, each of which has a radially inward facing bearing surface 10 in confronting, bearing relation to the supported shaft 1. The sliding components 3 are supported in a radial direction by their radially outer midpart being in radially outer thrust transmitting engagement with a spring component 4. Each sliding component 3 forms, together with one juxtaposed spring component 4, a two-part substructure 11. The circumferentially opposite ends of the spring component 4 are in radially outer thrust transmitting engagement with shoulders or projections 5 on supports 6 of the outer casing 2. The spring components 4 are spaced radially from the casing to form dampening chambers 7 on the radially outer side of the substructures 11. The supports 6 extend radially inward a sufficient distance to circumferentially engage and position the sliding components 3 as well as the spring components 4. The radially inner contour or surface 10 of the sliding components 3 is cylindrical in shape with a radius slightly greater than the diameter of the shaft so that two wedge-shaped converging support wedges or pockets 8a and 8b are formed by each sliding component 3.

Each of the elastic components 4 is fabricated from a material with a precisely determined elastic value, so that all the elastic components 4 have a precisely determined degree of elasticity. The radially inner sliding components 3, which are resiliently supported at their midparts by radial engagement with the elastic components 4, are made from a predominantly rigid material. Altogether, four radially outer elastic components 4 and four radially inner sliding components 3 are provided. In bearings for large diameter shafts, it may be desirable to provide a greater number of elastic components 4 and sliding components 3 for smoothly supporting shaft 1 about its circumference.

The function of the illustrated aerodynamic slide bearing depends on the fact that, when the shaft 1 is rapidly rotated, pressure is built up in the lubricant by the converging support wedges 8a or 8b which may also be described as converging or wedge-shaped lubrication pockets. For aerodynamic slide bearings, air or other gases are used predominantly as the lubricants. The pressure buildup in the wedge-shaped pockets 3a, 3b separates the shaft 1 from the substructures 11, which results in a substantial frictionless and low-wear support of shaft 1. The matching of materials for the shaft 1 and the sliding components 3 is such that, even during start-up, sliding friction is kept relatively low. Preferably, artificial carbon (pressed graphite) or a ceramic material is used for the sliding components 3 of the substructures 11 and case-hardened carbon alloy steel is used for shaft 1.

The radially outer spring components 4 provide the desired elastic characteristics of the aerodynamic slide bearing, while the dampening chambers 7 provide a defined level of shock absorption or dampening for the aerodynamic slide bearing because of the radial width and volume of the dampening chambers 7. Because of this separation of functions, model calculations for optimum design of the aerodynamic slide bearing is much easier than heretofore possible. The aerodynamic slide bearing can thus be provided with precisely specified characteristic value of elasticity and shock absorption, so that an optimum bearing function is provided. Since the aerodynamic slide bearing has a plurality of separate circumferentially spaced structures 11, the bearing is relatively insensitive to tilting and can compensate well for geometric deviations in the bearing geometry.

Figure 2:
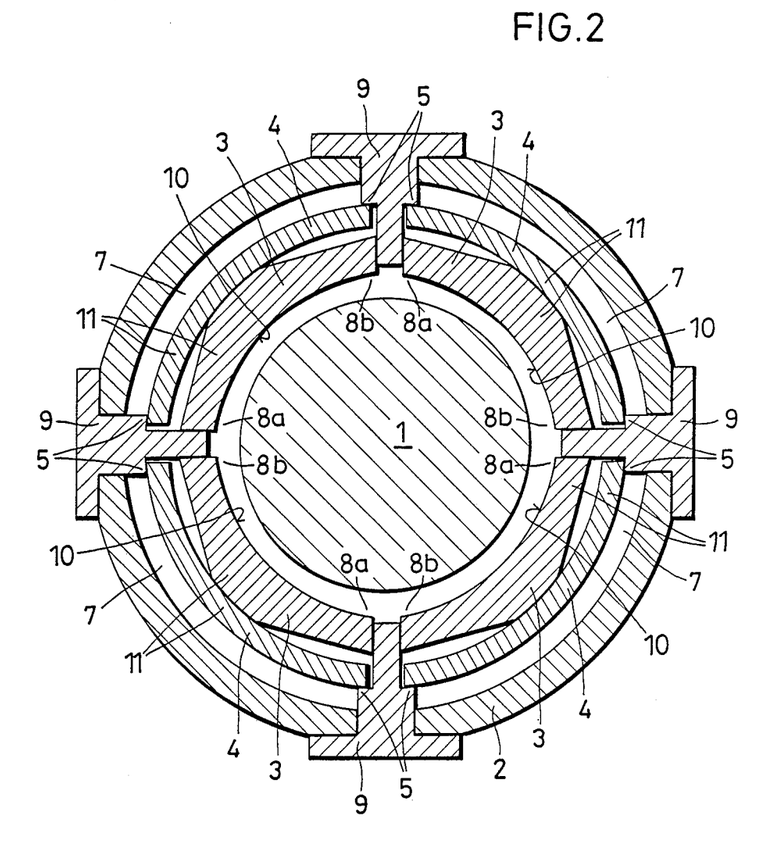
FIG. 2 is a cross section through a second embodiment of an aerodynamic slide bearing of this invention wherein the substructure components are supported on pins extending through openings in the outer casing.

In the embodiment of FIG. 2, pins 9 are provided in place of supports 6, which are inserted through circumferentially spaced slots in the casing 2 and are connected securely with casing 2. The pins 9 have shoulders 5 with which the circumferentially opposite ends of spring components 4 are in radially outward thrust transmitting engagement. The outer casing 2 can be fabricated with a cylindrically shaped interior and subsequently provided with the proper inner contour for the aerodynamic slide bearing by the addition of pins 9. The fabrication of such an aerodynamic slide bearing is particularly inexpensive. The radially outer side of the sliding component 3 of each of the substructures 11 of FIG. 2 has flat surfaces which extend from the circumferentially intermediate part radially engaging the elastic component 4 to the circumferential ends of the sliding component 3. This construction also contributes low-cost fabrication.

Figure 3:
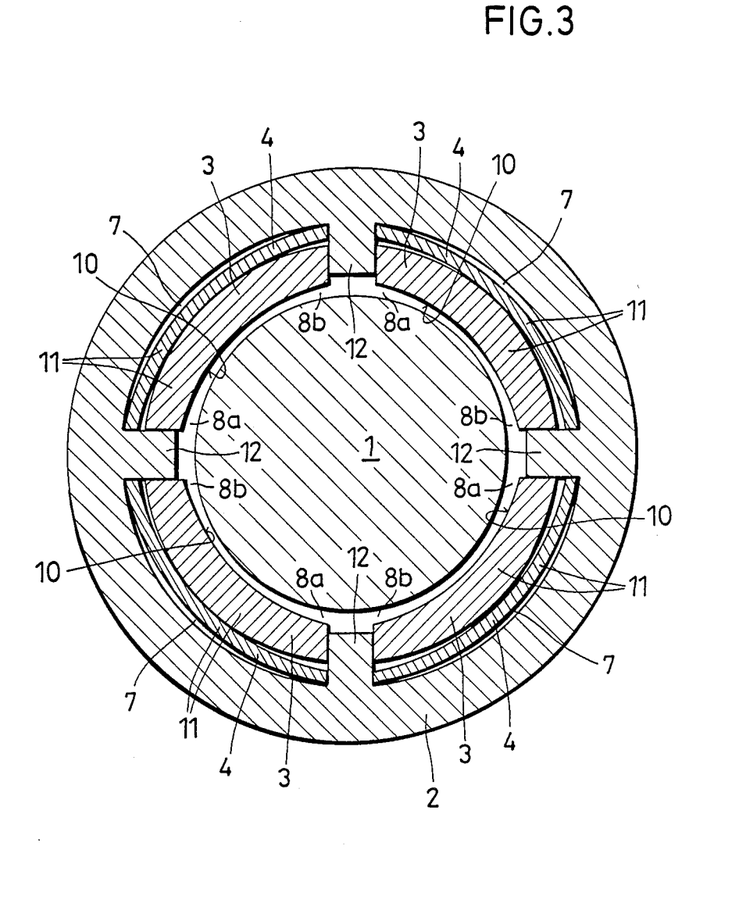
FIG. 3 is a cross section through a third embodiment of an aerodynamic slide bearing of this invention in which the substructures each has two components and crescent shaped dampening chambers are provided.

The aerodynamic slide bearing of FIG. 3 has bipartite substructures 11 including sliding components 3 and elastic components 4. The outer casing 2 is designed to be generally cylindrical in its inner contour, but has four circumferentially spaced extensions 12 projecting radially inward. The extensions 12 are integrally formed with the outer casing 2. It may, however, be convenient to create the equally spaced extensions 12 with inserted supports or pins. The sliding components 3 and the elastic components 4 are arcuate segments of a hollow cylinder or pipe, each with a different diameter. The shaft 1 has the smallest diameter, the sliding components 3 have the next smallest diameter, the interior of outer casing 2 has the next smallest diameter and, lastly, the elastic components 4 have the largest diameter. By proper selection of the various diameters, the proper dimensions of the support wedges 8a and 8b and the dampening chambers 7 are provided. The dampening chambers 7 are designed to be crescent-shaped in section perpendicular to the axis of the shaft 1. A central part of the each sliding component 3 rests circumferentially approximately in the middle of elastic component 4 on a line which is parallel to the axis of the supported shaft 1. Fabrication and assembly of an aerodynamic slide bearing such as this which is made of hollow cylinder or pipe segments is very cost efficient.

The aerodynamic slide bearings shown in FIGS. 1 through 3 are assembled by pushing the sets of generally juxtaposed elastic components 4 and sliding components 3 into the outer casing 2, which has been provided with supports and/or pins. Because of the side walls of the supports 6, pins 9, or extensions 12 which extend radially inward, the sliding components 3 and the elastic components 4 are prevented from falling radially inward and are prevented from rotating relative to the casing 2. Thus the aerodynamic bearing is maintained in assembly in its noninstalled condition. In a nonoperating condition of an installed aerodynamic slide bearing, the supported shaft 1 is not subjected to any prestressing by substructures 11. Thus during installation, the shaft 1 can be moved and guided through the substructures 11 without encountering any substantial resistance. This contributes to very favorable start-up behavior and emergency operation characteristics. The radial width of the dampening chambers is preferably kept at between 0.2% and 10%, and most advantageously at between 2% and 5%, of the diameter of the shaft 1.

Figure 4:
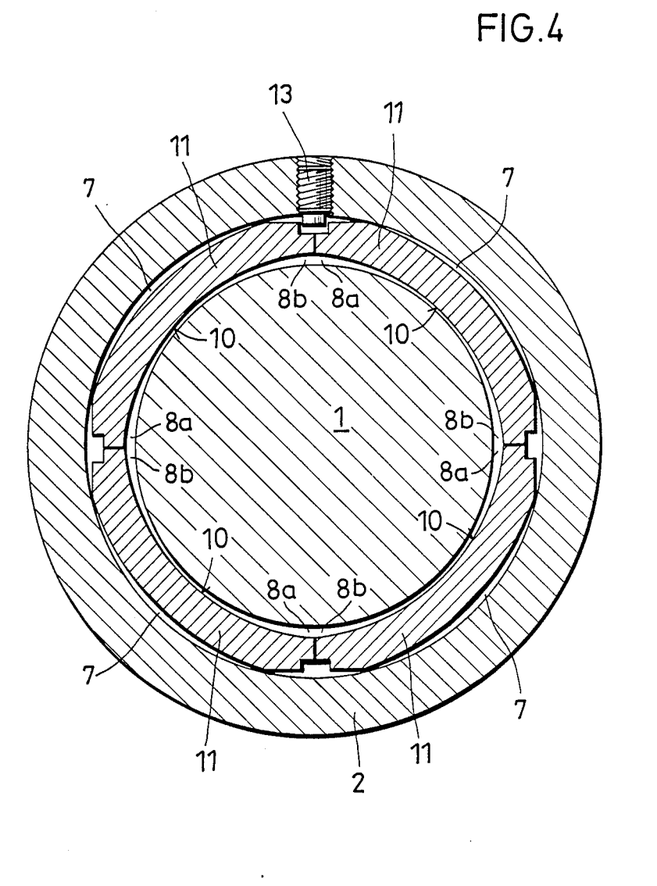
FIG. 4 is a cross section through a fourth embodiment of an aerodynamic slide bearing of this invention in which the substructures are each a one-piece component.

In the embodiment of FIG. 4, an aerodynamic slide bearing with single piece substructures 11 is shown. The circumferentially opposite ends of the single piece substructures 11 rest on outer casing 2 and the one-piece substructures are cylindrical in shape. The inner radius of the one-piece substructure 11 is greater than the radius of the shaft 1 and the outer radius of the one-piece substructure 11 is greater than the inner radius of the outer casing 2. This causes cresent-shaped dampening chambers 7, similar to those in FIG. 3, to automatically develop. The one-piece substructures 11 circumferentially abut one another, and are mildly stressed by each other. The relative circumferential positioning is therefore achieved by the substructures 11 themselves rather than by supports or pins on the outer casing 2 as in FIGS. 1–3. A threaded pin 13 is screwed into a drilled and tapped opening in the casing 2 and has an end extending radially into an indentation or radially outward open recess in the radially outer side of the substructures 11. The substructures 11 are made of a laminate, or composite material, with a high carbon content and have good sliding characteristics, as well as a predetermined elastic behavior. These single piece substructures are less expensive to fabricate than the bipartite partial structures 11 shown in FIGS. 1–3 and permit marked improvement in radial clearance and tolerances. The end of the pin 13, by extending radially inward into the interior of the casing 2, constitutes an abutment in circumferential thrust transmitting engagnement with circumferential facing surfaces of the recess at adjacent ends of two of the substructures 11. The pin 13, which is releasably mounted on the casing 2, may be installed after the substructures 11 are installed and upon installation prevents the substructures 11 from rotating relative to the casing. The supports 6 of the FIG. 1 embodiment, the pins 9 of the FIG. 2 embodiment and the extensions of the FIG. 3 embodiment are abutments extending radially inward from the surface of the casing wall defining its interior and these abutments are in circumferential thrust transmitting engagement relation to circumferentially confronting surfaces on the end postions of the substructures, thus serving to prevent the latter from rotating relative to the casing about the axis of the supported shaft 1.

The embodiments of the invention in which an exclusive property or privilege is claimed are defined as follows:

1. An aerodynamic slide bearing for a high speed shaft having an elastic and dampening structure nonrotatably mounted in an outer casing, which has at least one dampening chamber between the elastic and dampening structure and the outer casing, and wherein a plurality of converging lubrication pockets are provided between the elastic and dampening structure and the shaft, characterized by: said elastic and dampening structure is divided, in the circumferential direction of the slide bearing, into at least two separate substructures, said substructures having shaft supporting bearing surfaces with fixed contours creating said converging lubrication pockets, wherein said substructures are individually supported at their circumferentially opposite ends on said outer casing and a separate damping chamber is provided radially between each substructure and the interior of said outer casing, and wherein, in the unstressed condition of said slide bearing, the radial depth of said lubrication pocket is at its maximum and the radial depth of said dampening chamber is between 0.2 and 10 percent of the value of the diameter of the shaft supported by said slide bearing.

2. The aerodynamic slide bearing of claim 1 wherein said lubrication pockets are defined in part by surfaces on the radially inner side of said substructres which are cylindrical when the aerodynamic slide bearing is in an unstressed condition.

3. The aerodynamic slide bearing of claim 1 wherein said outer casing has a cylindrical interior surface and further comprising circumferentially spaced supports on the inside of said outer casing extending radially inwardly therefrom and engaging said substructure to fix the circumferential position of the latter relative to said outer casing.

4. The aerodynamic slide bearing of claim 3 wherein said substructures radially abut said supports.

5. The aerodynamic slide bearing of claim 1 wherein at least three substructures are provided.

6. The aerodynamic slide bearing of claim 1 wherein the clearances between said substructures and said shaft are such that the shaft is freely rotatable in the aerodynamic slide bearing in the unstressed condition of the latter.

7. The aerodynamic slide bearing of claim 1 wherein said fixed contours define cylinders whose radii are greater than the radius of the supported shaft.

8. The aerodynamic slide bearing of claim 1 characterized by the fact that, in the unstressed condition of the aerodynamic slide bearing, the clearance between the shaft and the circumferentially central part of said bearing surface of the substructures of the aerodynamic slide bearing is virtually zero, and wherein parts of said bearing surface diverge radially outward from said shaft in circumferentially opposite directions from said central part to define said lubrication pockets in the form of two converging support wedges whereby said aerodynamic slide bearing is operative in both directions of rotation of the shaft.

9. The aerodynamic slide bearing of claim 1 wherein each substructure includes a pair of radially inner and outer components in generally juxtaposed relation to one another, said inner component confronting said shaft and said outer component confronting said outer casing, said inner component being rigid and said outer component being a resilient spring.

10. The aerodynamic slide bearing of claim 9 wherein each of said outer components is a segment of a hollow cylinder whose outer radius is greater than the inner radius of said outer casing and whose inner radius is greater than the radius of the shaft supported by said bearing.

11. The aerodynamic slide bearing of claim 1 wherein said substructures are single piece components radially supported on said casing only at their circumferential ends, said single piece components having a close fitting relationship with said shaft at the circumferentially middle part of their radially inward facing bearing surfaces and said single piece components being made of material permitting resilient flexing in a radial direction.

12. The aerodynamic slide bearing of claim 11 wherein said substructures are substantially arcuate segments of a cylinder.

13. The aerodynamic slide bearing of claim 11 wherein said substructures are a composite material having a high carbon content.

14. aerodynamic slide bearing of claim 11 wherein said substructures are a laminate with a high carbon content.

15. aerodynamic slide bearing of claim 11 wherein said substructures are in circumferentially abutting relation to one another.

16. The aerodynamic slide bearing of claim 15 and further comprising a pin on said outer casing extending radially inward therefrom and engaging at least one of said substructures whereby said substructures are prevented from rotating relative to said outer casing.

17. The aerodynamic slide bearing of claim 11 wherein converging lubrication pockets are formed between said shaft and said single piece components on circumferentially opposite sides of said middle part of said bearing surfaces.

18. An aerodynamic slide bearing for a high speed shaft having an elastic and dampening structure nonrotatably mounted in an outer casing, which has at least one dampening chamber between the elastic and dampening structure and the outer casing, and wherein a plurality of converging lubrication pockets are provided between the elastic and dampening structure and the shaft, characterized by: said elastic and dampening structure is divided, in the circumferential direction of the slide bearing, into at least two separate substructures, and said substructures having shaft supporting bearing surfaces with fixed contours creating said converging lubrication pockets, each substructure including a pair of radially inner and outer components in generally juxtaposed relation to one another, said inner component confronting said shaft and said outer component confronting said outer casing, said inner component being rigid and said outer component being a resilient spring, said inner component being in radial thrust transmitting engagement with said outer component and the circumferentially opposite ends of said outer component being supported on said outer casing, said outer component being radially spaced from said outer casing intermediate its circumferentially opposite ends to form said dampening chamber therewith and abutments on the inside of said outer casing supporting and circumferentially positioning said components on the inside of said outer casing.

19. The aerodynamic slide bearing of claim 18 wherein said inner component engages a central surface part of said outer component on a line which is parallel to the axis of said shaft.

20. The aerodynamic slide bearing of claim 18 wherein said inner component is made of artificial carbon and said outer component is an arcuate segment of a steel tube.

21. An aerodynamic slide bearing for a high speed shaft having an elastic and dampening structure nonrotatably mounted in an outer casing, which has at least one dampening chamber between the elastic and dampening structure and the outer casing, and therein a plurality of converging lubrication pockets are provided between the elastic and dampening structure and the shaft, characterized by: said elastic and dampening structure is divided, in the circumferential direction of the slide bearing, into at least two separate substructures, and said substructures having shaft supporting bearing surfaces with fixed contours creating said converging lubricating pockets, each substructure including a pair of radially inner and outer components in generally juxtaposed relation to one another, said inner component being rigid and said outer conponent being a resilient spring, said inner component being a segment of a hollow cylinder having a cylindrical shaft supporting bearing surface which is in confronting relation to said shaft and which has a radius greater than the radius of said shaft, said outer component being a segment of a hollow cylinder whose inner radius is greater than the radius of said shaft and whose radially outer surface has a radius greater than the radius of the inside of said outer casing which it confronts.

22. The aerodynamic slide bearing of claim 22 wherein each of said inner components is a segment of a hollow cylinder whose outer radius is less than the inner radius of said outer component.

23. An aerodynamic slide bearing for a high speed shaft having an elastic and dampening structure nonrotatably mounted in an outer casing, which has at least one dampening chamber between the elastic and dampening structure and interior wall surface of the outer casing, and wherein a plurality of converging lubrication pockets are provided between the elastic and dampening structure and the bearing supported portion of said shaft, characterized by: said elastic and dampening structure is divided, in the circumferential direction of the slide bearing, into at least two separate substructures, and said substructures having shaft supporting bearing surfaces with fixed contours creating said converging lubrication pockets, circumferentially confronting surfaces at the adjacent ends of said substructures and an abutment disposed on said casing radially outward of said bearing supported portion of said shaft and extending radially inward of said interior wall surface between and in circumferential thrust transmitting relation to said circumferentially confronting surfaces, whereby said abutment prevents said substructure from rotating relative to said casing about the axis of said shaft.

24. The aerodynamic slide bearing of claim 23 wherein said abutment is a pin releasably mounted on said outer casing.

25. The aerodynamic slide bearing of claim 23 wherein said abutment extends between said adjacent ends of said substructures thereby maintaining said adjacent ends in circumferentially spaced relation to one another.

26. An aerodynamic slide bearing for a high speed shaft having an elastic and dampening structure nonrotatably mounted in the cylindrical interior of an outer casing, which has at least one dampening chamber between the elastic and dampening structure and the outer casing, and wherein a plurality of converging lubrication pockets are provided between the elastic and dampening structure and the shaft, characterized by: said elastic and dampening structure is divided, in the circumferential direction of the slide bearing, into at least two separate substructures, said substructures having shaft supporting bearing surfaces with fixed contours creating said converging lubrication pockets, each substructure including a pair of radially inner and outer components comprising arcuate segments of hollow cylinders, in juxtaposed relation to one another, said inner component presenting one of said shaft supporting bearing surfaces whose radius is greater than the radius of said shaft, said outer component being a resilient spring having an outer radius greater than the radius of said interior of said outer casing whereby its circumferentially opposite ends are supported on said cylindrical interior of said outer casing and having an inner radius greater than the outer radius of said inner component.

* * * * *

UNITED STATES PATENT OFFICE
CERTIFICATE OF CORRECTION

Patent No. 4,743,125　　　　　　Dated　May 10, 1988

Inventor(s)　Uwe Dammel and Dr. Bernd Domes

It is certified that error appears in the above-identified patent and that said Letters Patent are hereby corrected as shown below:

Column 9, line 30, "substructres" should read "substructures";

Column 10, in lines 23 and 26, "The" should be inserted before "aerodynamic";

Column 12, line 11, "substructure" should read "substructures".

Signed and Sealed this

Thirtieth Day of August, 1988

*Attest:*

DONALD J. QUIGG

*Attesting Officer*　　　*Commissioner of Patents and Trademarks*